(12) United States Patent
Chimdyalwar et al.

(10) Patent No.: US 11,650,907 B2
(45) Date of Patent: May 16, 2023

(54) SYSTEMS AND METHODS FOR SELECTIVE PATH SENSITIVE INTERVAL ANALYSIS

(71) Applicant: Tata Consultancy Services Limited, Mumbai (IN)

(72) Inventors: Bharti Chimdyalwar, Pune (IN); Shrawan Kumar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/463,622

(22) Filed: Sep. 1, 2021

(65) Prior Publication Data

US 2023/0004479 A1 Jan. 5, 2023

(30) Foreign Application Priority Data

Jun. 9, 2021 (IN) .............................. 202121025701

(51) Int. Cl.
*G06F 11/36* (2006.01)
*G06F 11/30* (2006.01)

(52) U.S. Cl.
CPC ........ *G06F 11/3636* (2013.01); *G06F 11/302* (2013.01); *G06F 11/3075* (2013.01); *G06F 11/3624* (2013.01)

(58) Field of Classification Search
CPC ............... G06F 11/3636; G06F 11/302; G06F 11/3075; G06F 11/3624

(Continued)

(56) References Cited

U.S. PATENT DOCUMENTS 5,999,736 A * 12/1999 Gupta .................... G06F 8/433
717/158
7,784,003 B2 * 8/2010 Buck ................... G06F 30/3312
716/113

(Continued)

FOREIGN PATENT DOCUMENTS

CN 101937388 A 1/2011

OTHER PUBLICATIONS

Dillig et al, "Sound, Complete and Scalable Path-Sensitive Analysis", ACM, pp. 270-280 (Year: 2008).*

(Continued)

*Primary Examiner* — Anil Khatri
(74) *Attorney, Agent, or Firm* — Finnegan, Henderson, Farabow, Garrett & Dunner LLP

(57) ABSTRACT

Abstract interpretation based static analysis tools use relational/non-relational abstract domains to verify program properties. Precision and scalability of analysis vary basis usage of abstract domains. K-limited path-sensitive interval domain is an abstract domain that was conventionally proposed for analysis on industry strength programs. The domain maintains variables' intervals along a configurable K subsets of paths at each program point, which implicitly provides co-relation among variables. When the number of paths at the join point exceeds K, set of paths are partitioned into K subsets, arbitrarily, which results in loss of precision required to verify program properties. To address the above problem, embodiments of the present disclosure provide selective merging of paths in such a way that the intervals computed help verifying more properties. The selective path-sensitive method of the present disclosure is based on the knowledge of variables whose values influence the verification outcome of program properties.

12 Claims, 2 Drawing Sheets

(58) Field of Classification Search
USPC .................................................. 717/120–156
See application file for complete search history.

(56) References Cited

U.S. PATENT DOCUMENTS

| | | | | |
|---|---|---|---|---|
| 8,079,020 | B2* | 12/2011 | Chilimbi | G06F 11/3447 717/124 |
| 8,302,086 | B2* | 10/2012 | Li | G06F 11/3608 717/154 |
| 8,671,397 | B2* | 3/2014 | Kalman | G06F 8/75 717/133 |
| 8,694,971 | B2* | 4/2014 | Chandra | G06F 21/563 717/124 |
| 9,275,178 | B1* | 3/2016 | Fung | G06F 30/3312 |
| 9,690,899 | B2* | 6/2017 | Rao | G06F 30/3312 |
| 9,767,239 | B1* | 9/2017 | Buck | G06F 30/367 |
| 10,460,108 | B1* | 10/2019 | Huang | G06F 21/566 |
| 10,613,842 | B2* | 4/2020 | Zhang | G06F 8/433 |
| 10,732,597 | B2* | 8/2020 | Linscott | G06F 9/54 |
| 10,868,665 | B1* | 12/2020 | Pohlack | H04L 63/1441 |
| 2009/0193401 | A1* | 7/2009 | Balakrishnan | G06F 9/44589 717/144 |
| 2020/0310951 | A1* | 10/2020 | Keynes | G06F 11/3692 |

OTHER PUBLICATIONS

Zheng et al, "Path Sensitive Static Analysis of Web Applications for Remote Code Execution Vulnerability Detection", IEEE, pp. 652-661 (Year: 2013).*
Dor et al, "Software Validation via Scalable Path-Sensitive Value Flow Analysis", ACM, pp. 12-22 (Year: 2004).*
Hampapuram et al, "Symbolic Path Simulation in Path Sensitive Dataflow Analysis", ACM, pp. 52-58 (Year: 2005).*
Gutzmann et al, "Towards Path-Sensitive Points-to Analysis", IEEE, pp. 59-68 (Year: 2007).*
Das et al., "ESP: Path-Sensitive Program Verification in Polynomial Time," (2002).
Dor et al., "Software Validation via Scalable Path-Sensitive Value Flow Analysis," (2004).
Hampapuram et al., "Symbolic Path Simulation in Path-Sensitive Dataflow Analysis," (2005).

* cited by examiner

SYSTEMS AND METHODS FOR SELECTIVE PATH SENSITIVE INTERVAL ANALYSIS

PRIORITY CLAIM

This U.S. patent application claims priority under 35 U.S.C. § 119 to: India Application No. 202121025701, filed on Jun. 9, 2021. The entire contents of the aforementioned application are incorporated herein by reference.

TECHNICAL FIELD

The disclosure herein generally relates to path sensitive analysis, and, more particularly, to systems and methods for selective path sensitive interval analysis.

BACKGROUND

Static code analysis based on abstract interpretation is widely used to detect bugs in large software systems. Analyses performed to detect potential bugs using relational abstract domains produce precise results as they track relations among variables by computing extra information, however, that limits their scalability while analyzing large software systems in practice. Whereas non-relational abstract domains such as interval domain scales on million lines of code but at the cost of precision. To combine the benefits of both the domains, conventional industrial static analysis tools either selectively apply both kinds of domains or design a new domain which is scalable and captures useful relationship among program variables showing effectiveness in practice.

The static analysis using K-limited path sensitive interval domain has shown precision with scalability on million lines of code. The domain maintains path-wise information of variables in the form of intervals, along limited K subsets of paths. Maintaining path-wise interval information for variables implicitly provides co-relation among values of variables. During the join operation at a program point, when the number of paths exceeds K, the set of paths are partitioned into K subsets, arbitrarily. The arbitrary partitioning or merging of paths can lead to imprecise intervals of variables which are influencing (in)validity of program properties. This imprecision makes the analyzer unable to determine verification result of program properties. If the paths are merged in such a way that these variables can retain precise values, analyzer can determine verification results of more program properties.

SUMMARY

Embodiments of the present disclosure present technological improvements as solutions to one or more of the above-mentioned technical problems recognized by the inventors in conventional systems. For example, in one aspect, there is provided a processor implemented for selective path sensitive interval analysis. The method includes obtaining, via one or more hardware processors, a program code including one or more program properties and a plurality of paths. The method also includes reading, via the one or more hardware processors, one or more variables in the one or more program properties to obtain one or more read variables, each of the one or more read variables correspond to a value. The method also includes computing, via the one or more hardware processors, one or more value impacting conditions (VICs) based the value being influenced in the one or more read variables. The method also includes identifying, via the one or more hardware processors, one or more variables of interest (VoIs) based on one of (i) one or more variables read by the one or more value impacting conditions (VICs) and have transitive data dependence on the one or more read variables in the one or more program properties, (ii) the one or more read variables in the program properties, or (iii) one or more reset variables read in the one or more program properties. The one or more reset variables include a constant or a value defined via an external input. The method also includes selecting and merging, via the one or more hardware processors, two or more paths of the plurality of paths included in the program code based on the one or more identified VoIs, wherein the two or more paths are selected and merged based on a number of paths at a join point being identified.

In an embodiment, the two or more paths are selected and merged to maintain a select subset of paths at the join point.

In an embodiment, each of the two or more selected paths comprise at least one VoI from the one or more identified VoIs, wherein the at least one VoI comprise a variable interval in each of the two or more selected paths. The variable interval comprises an upper bound value and a lower bound value.

In an embodiment, the step of selecting and merging two or more paths of the plurality of paths comprised in the program code is based on the upper bound value and the lower bound value comprised in the variable interval.

In an embodiment, the step of selecting and merging two or more paths of the plurality of paths is based on one or more criteria, the one or more criteria being one of (i) the variable interval in the two or more paths are identical with each other. (ii) a union of the variable interval from the two or more paths forms a continual interval.

In an embodiment, the step of selecting and merging two or more paths of the plurality of paths comprised in the program code is based on an order of the one or more identified VoIs comprised in the one or more program properties of the program code.

In another aspect, there is provided a system for selective path sensitive interval analysis. The system comprises a memory storing instructions and one or more communication interfaces. The system also inlcudes one or more hardware processors coupled to the memory via the one or more communication interfaces. The one or more hardware processors are configured by the instructions to obtain a program code comprising one or more program properties and a plurality of paths, read one or more variables in the one or more program properties to obtain one or more read variables, each of the one or more read variables corresponding to a value. The one or more hardware processors are also confirmed to compute one or more value impacting conditions (VICs) based the value being influenced in the one or more read variables, identify one or more variables of interest (VoIs) based on one of (i) one or more variables read by the one or more value impacting conditions (VICs) and have transitive data dependence on the one or more read variables in the one or more program properties, (ii) the one or more variables read in the one or more program properties, or (iii) one or more reset variables read in the one or more program properties. The one or more reset variables comprise a constant or a value defined via an external input. The one or more hardware processors are also configured to select and merge two or more paths of the plurality of paths comprised in the program code based on the one or more identified VoIs, wherein the two or more paths are selected and merged based on a number of paths at a join point being identified.

In an embodiment, the two or more paths are selected and merged to maintain a select subset of paths at the join point.

In an embodiment, each of the two or more selected paths comprise at least one VoI from the one or more identified VoIs, wherein the at least one VoI comprise a variable interval in each of the two or more selected paths. The variable interval comprises an upper bound value and a lower bound value.

In an embodiment, the two or more paths of the plurality of paths comprised in the program code are selected and merged based on the upper bound value and the lower bound value comprised in the variable interval.

In an embodiment, the two or more paths of the plurality of paths comprised in the program code are selected and merged are based on one or more criteria, the one or more criteria being one of (i) the variable interval in the two or more paths are identical with each other, (ii) a union of the variable interval from the two or more paths forms a continual interval.

In an embodiment, the two or more paths of the plurality of paths comprised in the program code are selected and merged based on an order of the one or more identified VoIs comprised in the one or more program properties of the program code.

In yet another aspect, there are provided one or more non-transitory machine-readable information storage mediums comprising one or more instructions which when executed by one or more hardware processors cause a method for selective path sensitive interval analysis. The method includes obtaining, via one or more hardware processors, a program code including one or more program properties and a plurality of paths. The method also includes reading, via the one or more hardware processors, one or more variables in the one or more program properties to obtain one or more read variables, each of the one or more read variables correspond to a value. The method also includes computing, via the one or more hardware processors, one or more value impacting conditions (VICs) based the value being influenced in the one or more read variables. The method also includes identifying, via the one or more hardware processors, one or more variables of interest (VoIs) based on one of (i) one or more variables read by the one or more value impacting conditions (VICs) and have transitive data dependence on the one or more read variables in the one or more program properties, (ii) the one or more variables read in the one or more program properties, or (iii) one or more reset variables read in the one or more program properties. The one or more reset variables include a constant or a value defined via an external input. The method also includes selecting and merging, via the one or more hardware processors, two or more paths of the plurality of paths comprised in the program code based on the one or more identified VoIs, wherein the two or more paths are selected and merged based on a number of paths at a join point being identified.

In an embodiment, the two or more paths are selected and merged to maintain a select subset of paths at the join point.

In an embodiment, each of the two or more selected paths comprise at least one VoI from the one or more identified VoIs, wherein the at least one VoI comprise a variable interval in each of the two or more selected paths. The variable interval comprises an upper bound value and a lower bound value.

In an embodiment, the step of selecting and merging two or more paths of the plurality of paths comprised in the program code is based on the upper bound value and the lower bound value comprised in the variable interval.

In an embodiment, the step of selecting and merging two or more paths of the plurality of paths is based on one or more criteria, the one or more criteria being one of (i) the variable interval in the two or more paths are identical with each other, (ii) a union of the variable interval from the two or more paths forms a continual interval.

In an embodiment, the step of selecting and merging two or more paths of the plurality of paths comprised in the program code is based on an order of the one or more identified VoIs comprised in the one or more program properties of the program code It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Abstract interpretation based static analysis tools use relational/non-relational abstract domains to verify program properties. Precision and scalability of analysis vary basis usage of abstract domains. K-limited path-sensitive interval domain is an abstract domain that was conventionally proposed for analysis on industry strength programs. The domain maintains variables' intervals along a configurable K subsets of paths at each program point, which implicitly provides co-relation among variables. When the number of paths at the join point exceeds K, set of paths are partitioned into K subsets, arbitrarily, which results in loss of precision required to verify program properties. To address the above problem, embodiments of the present disclosure provide selective merging of paths in such a way that the intervals computed help verifying more properties. The selective path-sensitive method of the present disclosure is based on the knowledge of variables whose values influence the verification outcome of program properties.

Figure 1:
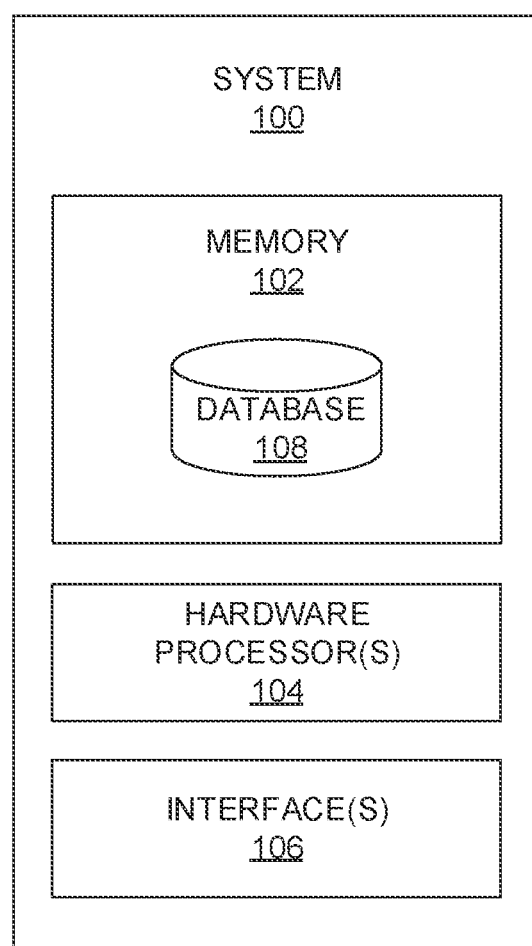
FIG. 1 illustrates an exemplary block diagram of a system for selective path sensitive interval analysis, in accordance with an embodiment of the present disclosure.
Figure 2:
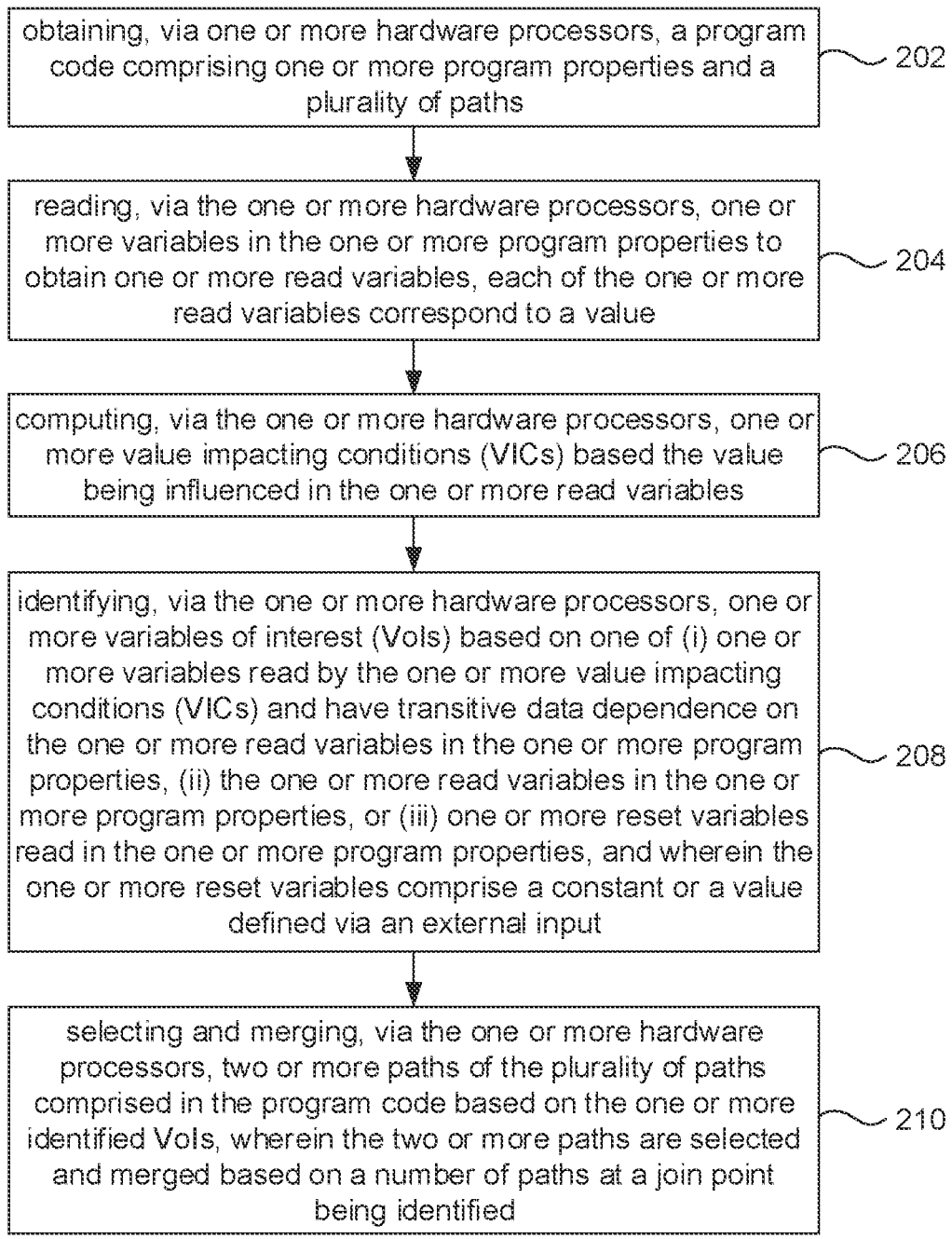
FIG. 2 illustrates an exemplary flow diagram of a method for selective path sensitive interval analysis using the system of FIG. 1, in accordance with an embodiment of the present disclosure.

Referring now to the drawings, and more particularly to FIGS. 1 through 2, where similar reference characters denote corresponding features consistently throughout the figures, there are shown preferred embodiments and these embodiments are described in the context of the following exemplary system and/or method.

FIG. 1 illustrates an exemplary block diagram of a system for selective path sensitive interval analysis, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104, The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to program code, variables read in the program properties, variable intervals, value impacting conditions, variables of interest, paths being selected and merged, and like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, illustrates an exemplary flow diagram of a method for selective path sensitive interval analysis using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram of FIG. 2. In an embodiment of the present disclosure, at step 202, the one or more hardware processors 104 obtain a program code comprising one or more program properties and a plurality of paths. Below considered is sample program code (C code) as shown below with a valid property encoded as an assertion at line 20.

Sample C Code:

```
1.  ....
2.  unsigned inf b = 0, c = 0, d = 0, s = c,i = 0;
3.  while (1){
4.      if(s == 0){
5.          c = 2;
6.          b = c + 6;
7.          s = 1;
8.      }
9.      else if(s == 1){
10.         c = 1;
11.         d = c + 2;
12.         b = d;
13.         s = 2;
14.     }
15.     else if(s == 2){
16.         if(d > 1)
17.             b = d;
18.         else
19.             b = c;
20.         assert (b == 3);
21.     }
22. }
23. ....
```

In the present disclosure, a method is provided to identify variables which are influencing the verification outcome of program properties and termed them as Variables of Interest (VoIs), Obvious choice of such VoIs is variables read in program properties. However, this choice is useful when variables read in properties do not have any transitive data dependence on other variables, which is very uncommon in industrial applications. Therefore, to make K-limited path sensitive interval analysis more effective in industrial settings, more intelligent identification of VoIs is needed Once VoIs are identified, the identified VoIs are used to make existing K-limited path sensitive interval analysis as selective path-sensitive interval analysis. Therefore, at step 204, the one or more hardware processors read one or more variables in the one or more program properties to obtain one or more read variables, each of the one or more read variables correspond to a value.

The above example of C code is to be analyzed with K=2. In this example, at the third iteration of the loop, three paths $P_0$, $P_1$, and $P_2$ meets at loop node (line 3). These paths are given as follows:

$P_0$: {s=[0,0], d=[0,0], c=[0,0], b=[0,0]} //from top of the loop
$P_1$: {s=[1,1], d=[0,0], c=[2,2], b=[8,8]} //from first block of if statement
$P_2$: {s=[2,2], d=[3,3], c=[1,1], b=[3,3]} //from second block of if statement To decide verification result of the property, path $P_2$ should not be merged with other paths. Arbitrarily deciding which paths to merge may result into merging of $P_2$ with $P_0$ or $P_1$. This leads to an imprecise interval [0,3] or [3,8] of variable b at the loop node, with which analysis cannot decide validity of the encoded program property. Moreover, just looking at a value of read variable b in the property, here, it cannot be decided which two paths to merge. However, if one tracks the value of a variable d, which is actually controlling value assigned to variable b, one can decide merging of paths $P_0$, $P_1$ in one and keeping $P_2$ un-merged to retain K=2 and precise interval for d. The resultant paths after this merging at loop node at the start of third iteration of loop will be as follows:

$P_0+P_1$: {s=[0,1], d=[0,0], c=[0,2], b=[0,8]}
$P_2$: {s=[2,2], d=[3,3], c=[1,1], b=[3,3]}

This results only path $P_2$ to enter in third else-if block and helps validate the property.

In an embodiment, at step 206, the one or more hardware processors 104 compute, via the one or more hardware processors, one or more value impacting conditions (VICs) based the value being influenced in the one or more read variables. In an embodiment, at step 208, the one or more hardware processors 104 identify one or more variables of interest (VoIs) based on one of (i) one or more variables read by the one or more value impacting conditions and have transitive data dependence on the one or more read variables (or the one or more variables read) in the one or more program properties, (ii) the one or more variables read in the one or more program properties, or (iii) one or more reset variables read in the one or more program properties. The one or more reset variables comprise a constant or a value defined via an external input (e.g., a user defined value). In an embodiment, statements 'one or more variables read by' the one or more variables read in the one or more program properties' and 'the one or more read variables in the one or more program properties' refer to variables read from/in the program properties and may be interchangeably used herein. The steps 206 and 208 are better understood by way of following description.

Variable of interest with respect to a property $\phi$ is denoted as $VoIs(\phi)$. Let $V_r$ be the variables read in $\phi$ and $DD(\phi)$ be the transitive data dependence of $V_r$. $V(DD(\phi))$ represents set of variables defined at each statement present in $DD(\phi)$. Value impacting conditions (VICs) are computed, which influence the values of variables in $V_r$. In the above program code, assert at line 20 represents a property $\phi$, $V(DD(\phi))=\{b, c, d\}$ and $VICs=\{4, 9, 16\}$ (condition expressions at given line numbers). $VoIs(\phi)$ are those variables from $V(DD(\phi))$ which are read by some VICs. Since, only variable d is being read in VIC at line 16, $VoIs(\phi)=\{d\}$.

In general, $VoIs(\phi)$ is given as follows:

$$VoIs(\phi)=\{v \in V(DD(\phi)) | v \text{ read in some } c \in VICs \lor v \text{ is a reset variable}\} \quad (1)$$

if ($VoIs(\phi)$ is empty) then $VoIs(\phi)=V_r$.

Currently; computation of VoIs is intra-procedural. Program dependence graph as known in the art (e.g., "Gianfranco Bilardi and Keshav Pingali. 1996. A Framework for Generalized Control Dependence. In Proceedings of the ACM SIGPLAN 1996 Conference on Programming Language Design and Implementation (Philadelphia, Pa., USA) (PLDI '96). ACM, New York, N.Y., USA, 291-300. https://doi.org/10.1145/231379.231435") is used for computing transitive data dependence and VICs is computed accordingly (e.g., refer "Shrawan Kumar, Amitabha Sanyal, and Uday Khedker. 2015. Value Slice: A New Slicing Concept for Scalable Property Checking. In International Conference on Tools and Algorithms for the Construction and Analysis of Systems. Springer, 101-115" for VICs computation).

Once the VoIs are identified, at step 210 of the present disclosure, the one or more hardware processors 104 select and merge two or more paths of the plurality of paths comprised in the program code based on the one or more identified VoIs. The two or more paths are selected and merged based on a number of paths at a join point being identified. For instance, at a given join point, if the number of paths say 'n' exceeds a predefined threshold 'K' (e.g., wherein K is also referred predefined paths for a given join point), the two or more paths are selected and merged accordingly. The selection and merging of paths are performed to maintain a select subset of paths at the join point, in one embodiment of the present disclosure. The above step of 210 is better understood by way of following description:

As described above, when the number of paths at a join point exceeds K, at least few (or subset of) paths are merged to maintain K subsets at the join point. The present disclosure uses the identified VoIs to select and merge subset of paths. For simplicity of presentation, consider there is VoI v, and interval for v is present in all n paths $p_1, p_2 \ldots p_K \ldots p_n$, where n>K, meeting at a join point. Criteria applied on intervals of v to decide merging of n–(K–1) paths is given as follows: Let v has interval $v_i=[l_i, u_i]$ and $v_j=[l_j, u_j]$ in path $p_i$ and $p_j$, respectively, where $l_i, l_j$ are lower bound of interval and $u_i, u_j$ are upper bound.

Therefore, each of the two or more selected paths comprise at least one VoI from the one or more identified VoI. The at least one VoI comprise a variable interval in each of the two or more selected paths. Further, the variable interval comprises an upper bound value (e.g., $u_i, u_j$, and the like) and a lower bound value (e.g., $l_i, l_j$, and the like). Therefore, the selection and merging of two or more paths is performed by the present disclosure when the step of selecting and merging two or more paths of the plurality of paths when one or more criteria are met. For instance, the one or more criteria being one of (i) the variable interval in the two or more paths are identical with each other, (ii) a union of the variable interval from the two or more paths forms a continual interval. Thus, Paths $p_i$ and $p_j$ are merged if any one of the below criteria is met, wherein the one or more criteria are better understood by following expressions:

$$l_i=l_j \land u_i=u_j$$

$v_i \cup v_j$ results into continuous interval when any of the below conditions satisfy.

$$l_i<l_j \land (l_j=u_i) \lor l_j=u_i+1 \text{ or}$$

$$l_j<l_i \land (l_i=u_j) \lor l_i=u_j+1 \text{ or}$$

$$l_i<l_j \lor (l_i=l_j+1) \lor (l_j=l_i+1)$$

Union ($\cup$) over intervals is defined as per research work known in the art (e.g., refer "Patrick Cousot and Radhia Cousot. 1977. Abstract Interpretation: A Unified Lattice Model for Static Analysis of Programs by Construction or Approximation of Fixpoints. In Proceedings of the 4th ACM SIGACT-SIGPLAN Symposium on Principles of Programming Languages (Los Angeles, Calif.) (POPL '77), ACM, New York, N.Y., USA, 238-252. https://doi.org/10.1145/512950.512973").

During a join (or merging of paths) operation, above checks are performed for one VoI at a time until total number of paths become K at that join point. In above program code example, for identified VoI d, very first criterion is satisfied for path $P_0$ and $P_1$, so, those two paths are merged. It is observed above, with this merging of paths, the program property at line 20 has correctly verified as valid. When above defined criteria do not match for any of the identified VoIs (mostly, when set of n paths are disjoint), paths can be arbitrarily selected for merging.

However, there could be instances/scenarios, that for a given property, more than one VoIs can be identified. In the experiments conducted by the present disclosure, it has been observed that up to four VoIs were identified for a given property, however, at most two were used to make n paths into K paths. It is to be further noted that when there are more than one VoIs, order in which VoIs are picked to match defined criteria is also important, Consider below exemplary program code with encoded valid property (EVP) at line 16, to be analyze with K=2 having two VoIs={c,b}. Sample program code:

```
1.  unsigned int a = 0, f = 0, c = *, b = *;
2.  func ( ){
3.
4.  if(c < 10){
5.     a = c;
6.     b = 0;
7.  }                          // Path P₁
8.  else {
9.     if(b == 0)
10.       f = 0;                // Path P₂
11.    else {
12.       f = 1;
13.       b = f;
14.    }                        // Path P₃
15. }                           // join point
16. if(f != 0)
17.    assert (a < b);          // EVP
18. }
```

At the join point (end of line 14), three paths—
$P_1$:{a=[0,9],b=[0,0],c=[0, 9],f=[0,0]}
$P_2$:{a=[0,0],b=[0,0],c=[10,Max],f=[0,0]}
$P_3$:{a=[0,0],b=[1,1],c=[10,Max],f=[1,1]}
meet at that program point. To retain K=2, two paths need to be merged. Variable c as VoI results into merging of $P_2$ and $P_3$; resulting into paths—$P_1$:{a=[0,9] b=[0,0], c=[0,9], f=[0, 0]}
$P_2+P_3$:{a=[0,0], b=[0,1], c=[10,Max], f=[0,1]}. With this, path $P_2+P_3$ reaches at property $A_1$ and with the intervals of a and b in this path, verification result of the property cannot be decided (because property satisfy for b=1, but for b=0 it do not), and it will be unknown. Whereas variable b as VoI results into merging of $P_1$ and $P_2$, resulting into following paths—$P_1+P_2$:{a=[0,9], b=[0,0], c=[0,MAX], f=[0,0]} and $P_3$:{a=[0,0], b=[1,1], c=[10,Max], f=[1,1]}. With this, path $P_3$ reaches at the property and with the intervals of a and b in this path, assert EVP can be proved as valid. Thus, along with effective VoIs, their order also plays an effective role in verification of properties.

Based on above observation, if list of identified VoIs contains variables read in given property, then those variables take precedence in VoIs order while selecting paths (based on VoI) for merging at join point. In above example, read variable 'b' is present in identified VoIs list, so VoI 'b' has chosen first for selecting paths to be merged. In the present disclosure effective order of VoIs is made use by the system and method, which help to (in)validate program properties. It is ensured in the present disclosure that, on an application, with same analysis setting, for given program properties, identified VoIs order is always same. This further ensures that re-execution of an application with same setting always yields same result for given program properties.

Experimentation:

To evaluate the effectiveness of identified VoIs for selective path-sensitive interval analysis, the present disclosure has performed experiments on three industrial applications and academic benchmarks. The evaluation was focused on how many more properties could be (in)validated when the present disclosure the system and method perform the method of VoIs aware selective path-sensitive interval analysis as described herein.

Applications and Benchmarks:

Present disclosure selected three industrial C applications and 36 benchmarks belonging to the control-flow sub-category of international software verification competition (SV-COMP) 2021 repository (e.g., refer '2021. SV-COMP 2021—10th International Competition on Software Verification. http://sv-comp.sosy-lab.org/2021/.'). These selected industry applications and benchmarks are respectively shown as $A_{1-3}$ and SV in Table 1. More specifically, Table 1 depicts selective path sensitive interval analysis results.

TABLE 1

| Application | KLOC | Number of asserts | Number of (in)validated asserts using VoIs as | |
|---|---|---|---|---|
| | | | Variables read in assert (prior art*) | As per method of the present disclosure |
| A1 | 7.7 | 196 | 11 | 50 |
| A2 | 8 | 94 | 30 | 54 |
| A3 | 18.3 | 341 | 56 | 140 |
| SV | 62 | 36 | 24 | 24 |
| Total | 96 | 667 | 121 | 268 |

*refer - Mohammad Afzal et al. 2020. VeriAbs: Verification by Abstraction and Test Generation (Competition Contribution). In International Conference on Tools and Algorithms for the Construction and Analysis of Systems, TACAS 2020. Springer, 383-387. https://doi.org/10.1007/978-3-030-45237-7_25.

The industrial application $A_1$ implements a smart-card functionality. $A_2$ and $A_3$ implements a protocol stack and a CAN Driver application of a vehicle, respectively. In SV-COMP benchmarks, the present disclosure selected all 36 programs contributed by predicate abstraction-based tool, BLAST (as known in the art tool). The selected programs have intensive control flow with size ranges from 1.6-1.8 KLOC.

Analysis of Applications and Benchmarks:

The present disclosure analyzed all three industrial applications for invalid array indexing, division by zero, integer overflows and underflows. To verify these properties, first the method of the present disclosure applied K-limited path sensitive interval analysis with K=10. The unresolved properties (which cannot be determined as valid/invalid) are flagged as warnings. These warnings are automatically encoded as assertions (assert function calls) under #ifdef labels. The present disclosure evaluated one assert at a time by defining appropriate #ifdef label, VoIs with respect to an assert are computed and using these VoIs, selective path-sensitive interval analysis with same value of K is applied to verify the assert.

The SV-COMP benchmarks have conditional error reachability labels. The present disclosure considers error reachable condition as the program property. None of the 36 programs were validated using K-limited path sensitive interval analysis with K=150. So, VoIs aware selective path-sensitive interval analysis with same value of K was applied by the present disclosure to these programs. All applications and benchmarks have been analyzed using 2.11 GHz Intel processor, 16 GB of RAM and a 64-bit Windows OS.

Evaluation Results:

To assess the benefits of VoIs computation as described by the method of the present disclosure, the present disclosure verified a total of 667 asserts by considering VoIs in both ways, directly read variables in assert (prior art) and method of the present disclosure as described in FIG. 2. The evaluation result presented in above Table 1 indicates that the selective path-sensitive interval analysis using VoIs identification of FIG. 2 results in verifying 268 (approximately 40%) more asserts as compared to arbitrarily merging of subset of paths. Also, VoIs identification of the present disclosure has led to verifying 147 (23%) more asserts as valid/invalid as compared to considering read variables as VoIs in an assert (prior art technique).

All (in)validated asserts in $A_{1-3}$ and SV by considering VoIs as read variables in assert are also (in)validated using the VoIs identification of the present disclosure. Reason is, in $A_1$, $A_3$, and SV, 11, 56, and 24 (in)validated asserts, respectively, reads only reset variables. While 30 asserts in $A_2$ fall in the scenario given in below sample code, whereby both approaches, identified VoI is {x}.

Sample Program Code Depicting Scenario in $A_2$:

```
1. white (arr[x] != '\O '){
2.    assert (x < 0 && x > 100);
3.    x ++;
4. }
```

However, 12 non-verified programs from SV, where program property reads only reset variables have VICs which are controlling values assigned to these reset variables. Present disclosure does not consider VCs for reset variables; hence, these programs did not get benefit from present disclosure. The non-verified 387 properties on industrial applications ($A_1$-$A_3$) either had their computed VoIs set as empty as per equation (1) (resulting V becomes VoIs) or identified VoIs did not satisfy the criteria defined for join operation. So, during join operation, in former case, path merging did not result into effective paths to help (in)validate properties; and in the later one path merging fell back to arbitrary selection and merging thus resulting into loss of precision required to verify properties.

In the experiments conducted by the present disclosure, the method applied VoIs aware selective path-sensitive interval analysis to one property at a time. However, in general, it can be effectively applied to a group of related program properties which share common data and/or control dependence. Because due to common program dependence, identified VoIs tend to be common for each individual property in such a group of properties. Overall, through experiments, it has been observed that selective path sensitivity with effective VoIs has the practical advantage.

Embodiments of the present disclosure provide system and method for selective path-sensitive interval analysis for precise and scalable property verification in practice. The analysis is selective using variables of interest (VoIs) with respect to program properties. The method of the present disclosure included identification of these variables of interest with respect to a property which can help (in)validate that property. The present disclosure further demonstrated the effectiveness of the approach by verifying 40% more properties as compared to analysis which do not use knowledge of VoIs over industrial automotive applications. This shows that the selective analysis is the need for effective property verification in practice and guided selection with respect to program properties is the key to achieve precision with scalability.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the Ike, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional budding blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item r items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining, via one or more hardware processors, a program code comprising one or more program properties and a plurality of paths;
   reading, via the one or more hardware processors, one or more variables in the one or more program properties to obtain one or more read variables, each of the one or more read variables correspond to a value;
   computing, via the one or more hardware processors, one or more value impacting conditions (VICs) based the value being influenced in the one or more read variables;
   identifying, via the one or more hardware processors, one or more variables of interest (VoIs), influencing verification outcome of the one or more program properties, based on one of (i) one or more variables read by the one or more value impacting conditions (VICs) and have transitive data dependence on the one or more read variables in the one or more program properties, (ii) the one or more read variables in the one or more program properties, or (iii) one or more reset variables read in the one or more program properties, and wherein the one or more reset variables comprise a constant or a value defined via an external input; and
   selecting and merging, via the one or more hardware processors, two or more paths of the plurality of paths comprised in the program code based on the one or more identified VoIs, wherein the two or more paths are selected and merged based on a number of paths at a join point being identified,
   wherein the step of selecting and merging the two or more paths of the plurality of paths is based on one or more criteria, the one or more criteria being one of (i) the variable interval in the two or more paths are identical with each other, (ii) a union of the variable interval from the two or more paths forms a continual interval,
   wherein during merging of the two or more paths the criteria is checked for one VoI at a time until total number of paths become the select subset of paths at that join point, and when the criterion (i) is satisfied for two paths, then the two paths are merged, wherein when both criteria (i) and (ii) does not match for any of the identified VoIs when the set of paths are disjoint, then the paths are arbitrarily selected for merging,
   wherein when a list of identified VoIs contains variables read in given program property, then those variables take precedence in VoIs order while selecting paths for merging at the join point, wherein on an application with same analysis setting for given program properties then the identified VoIs order is always same and thereby ensuring that re-execution of the application with same setting always yield same result for the given program properties.

2. The processor implemented method of claim 1, wherein the two or more paths are selected and merged to maintain a select subset of paths at the join point.

3. The processor implemented method of claim 1, wherein each of the two or more selected paths comprise at least one VoI from the one or more identified VoI, wherein the at least one VoI comprise a variable interval in each of the two or more selected paths, and wherein the variable interval comprises an upper bound value and a lower bound value, wherein once the VoIs are identified, the identified VoIs are used to make K-limited path sensitive interval analysis as selective path-sensitive interval analysis and the selective path-sensitive interval analysis is based on knowledge of the variables whose values influence the verification outcome of the program properties.

4. The processor implemented method of claim 3, wherein the step of selecting and merging two or more paths of the plurality of paths comprised in the program code is based on the upper bound value and the lower bound value comprised in the variable interval.

5. A system, comprising:
   a memory storing instructions;
   one or more communication interfaces; and
   one or more hardware processors coupled to the memory via the one or more communication interfaces, wherein the one or more hardware processors are configured by the instructions to:
   obtain a program code comprising one or more program properties and a plurality of paths;
   read one or more variables in the one or more program properties to obtain one or more read variables, each of the one or more read variables correspond to a value;
   compute one or more value impacting conditions (VICs) based the value being influenced in the one or more read variables;
   identify one or more variables of interest (VoIs), influencing verification outcome of the one or more program properties, based on one of (i) one or more variables read by the one or more value impacting conditions (VICs) and have transitive data dependence on the one or more read variables in the one or more program properties, (ii) the one or more read variables in the one or more program properties, or (iii) one or more reset variables read in the one or more program properties, and wherein the one or more reset variables comprise a constant or a value defined via an external input; and
   select and merge two or more paths of the plurality of paths comprised in the program code based on the one or more identified VoIs, wherein the two or more paths are selected and merged based on a number of paths at a join point being identified,
   wherein the step of selecting and merging the two or more paths of the plurality of paths is based on one or more criteria, the one or more criteria being one of (i) the variable interval in the two or more paths are identical with each other, (ii) a union of the variable interval from the two or more paths forms a continual interval,
   wherein during merging of the two or more paths the criteria is checked for one VoI at a time until total number of paths become the select subset of paths at that join point, and when the criterion (i) is satisfied for two paths, then the two paths are merged, wherein when both criteria (i) and (ii) does not match for any of the identified VoIs when the set of paths are disjoint, then the paths are arbitrarily selected for merging, wherein when a list of identified VoIs contains variables read in given program property, then those variables take precedence in VoIs order while selecting paths for merging at the join point, wherein on an application with same analysis setting for given program properties then the identified VoIs order is always same and thereby ensuring that re-execution of the application with same setting always yield same result for the given program properties.

6. The system of claim 5, wherein the two or more paths are selected and merged to maintain a select subset of paths at the join point.

7. The system of claim 5, wherein each of the two or more selected paths comprise at least one VoI from the one or more identified VoI, wherein the at least one VoI comprise a variable interval in each of the two or more selected paths, and wherein the variable interval comprises an upper bound value and a lower bound value, wherein once the VoIs are identified, the identified VoIs are used to make K-limited path sensitive interval analysis as selective path-sensitive interval analysis and the selective path-sensitive interval analysis is based on knowledge of the variables whose values influence the verification outcome of the program properties.

8. The system of claim 7, wherein the two or more paths of the plurality of paths comprised in the program code are selected and merged are based on the upper bound value and the lower bound value comprised in the variable interval.

9. One or more non-transitory machine-readable information storage mediums comprising one or more instructions which when executed by one or more hardware processors cause a method for selective path sensitive interval analysis by:
- obtaining, via one or more hardware processors, a program code comprising one or more program properties and a plurality of paths;
- reading, via the one or more hardware processors, one or more variables in the one or more program properties to obtain one or more read variables, each of the one or more read variables correspond to a value;
- computing, via the one or more hardware processors, one or more value impacting conditions (VICs) based the value being influenced in the one or more read variables;
- identifying, via the one or more hardware processors, one or more variables of interest (VoIs), influencing verification outcome of the one or more program properties, based on one of (i) one or more variables read by the one or more value impacting conditions (VICs) and have transitive data dependence on the one or more read variables in the one or more program properties, (ii) the one or more read variables in the one or more program properties, or (iii) one or more reset variables read in the one or more program properties, and wherein the one or more reset variables comprise a constant or a value defined via an external input; and
- selecting and merging, via the one or more hardware processors, two or more paths of the plurality of paths comprised in the program code based on the one or more identified VoIs, wherein the two or more paths are selected and merged based on a number of paths at a join point being identified, wherein the step of selecting and merging the two or more paths of the plurality of paths is based on one or more criteria, the one or more criteria being one of (i) the variable interval in the two or more paths are identical with each other, (ii) a union of the variable interval from the two or more paths forms a continual interval, wherein during merging of the two or more paths the criteria is checked for one VoI at a time until total number of paths become the select subset of paths at that join point, and when the criterion (i) is satisfied for two paths, then the two paths are merged, wherein when both criteria (i) and (ii) does not match for any of the identified VoIs when the set of paths are disjoint, then the paths are arbitrarily selected for merging, wherein when a list of identified VoIs contains variables read in given program property, then those variables take precedence in VoIs order while selecting paths for merging at the join point, wherein on an application with same analysis setting for given program properties then the identified VoIs order is always same and thereby ensuring that re-execution of the application with same setting always yield same result for the given program properties.

10. The one or more non-transitory machine-readable information storage mediums of claim 9, wherein the two or more paths are selected and merged to maintain a select subset of paths at the join point.

11. The one or more non-transitory machine-readable information storage mediums of claim 9, wherein each of the two or more selected paths comprise at least one VoI from the one or more identified VoI, wherein the at least one VoI comprise a variable interval in each of the two or more selected paths, and wherein the variable interval comprises an upper bound value and a lower bound value, wherein once the VoIs are identified, the identified VoIs are used to make K-limited path sensitive interval analysis as selective path-sensitive interval analysis and the selective path-sensitive interval analysis is based on knowledge of the variables whose values influence the verification outcome of the program properties.

12. The one or more non-transitory machine-readable information storage mediums of claim 11, wherein the step of selecting and merging two or more paths of the plurality of paths comprised in the program code is based on the upper bound value and the lower bound value comprised in the variable interval.

* * * * *